United States Patent
Goshima et al.

[11] 3,960,443
[45] June 1, 1976

[54] OPTICAL HEAD MOVING DEVICE

[75] Inventors: Takeshi Goshima, Tokyo; Yoshinori Sugiura, Kawasaki; Kiyonobu Endo; Hideaki Sato, both of Yokohama; Kimio Kono; Takao Tsuji, both of Kawasaki, all of Japan

[73] Assignee: Canon Kabushiki Kaisha, Tokyo, Japan

[22] Filed: June 11, 1975

[21] Appl. No.: 585,822

[30] Foreign Application Priority Data
June 21, 1974 Japan.............................. 49-71000

[52] U.S. Cl............................ 350/247; 178/6.6 R; 179/100.3 L; 179/100.3 V; 350/16
[51] Int. Cl.²...................... G02B 7/02; G11B 7/08
[58] Field of Search ............ 350/245, 243, 247, 16, 350/21-24; 179/100.3 V, 100.3 L, 100.3 E; 178/66 DD, 6.7 R; 354/5, 18; 353/100, 101; 356/250

[56] References Cited
UNITED STATES PATENTS
| | | | |
|---|---|---|---|
| 1,812,851 | 7/1931 | Altman | 350/6 |
| 2,422,398 | 6/1947 | Dilks, Jr. | 179/100.3 V |

FOREIGN PATENTS OR APPLICATIONS
| | | | |
|---|---|---|---|
| 3,913 | 1/1971 | Japan | 350/16 |

*Primary Examiner*—John K. Corbin
*Assistant Examiner*—Wm. H. Punter
*Attorney, Agent, or Firm*—Fitzpatrick, Cella, Harper & Scinto

[57] ABSTRACT

In an optical head moving device, there is provided a pair of parallel, spaced apart guide members having the axes thereof lying on a common plane. A movable member having engaging portions engaged with the pair of guide members and a connecting portion connecting together the engaging portions is provided on the guide members. An optical head for focusing a light beam introduced thereinto is securely mounted on the movable member in such a manner that the emergence-side principal point of the optical head lies on the plane containing the axes of the pair of guide members. Means is provided for introducing a light beam into the optical head. Mover means is provided for moving the movable means with the engaging portions thereof in engagement with the guide members, to thereby move the optical head.

11 Claims, 11 Drawing Figures

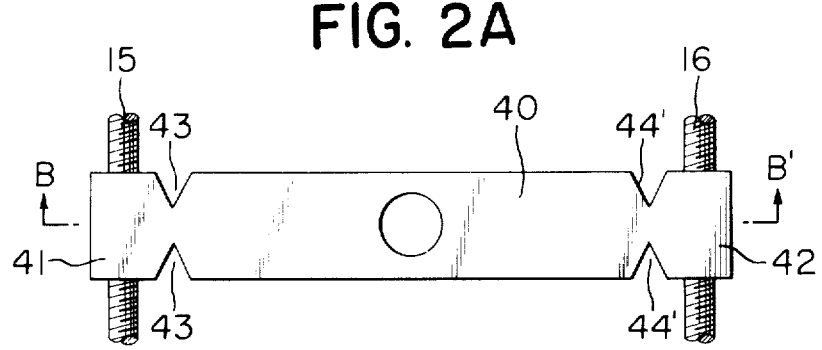
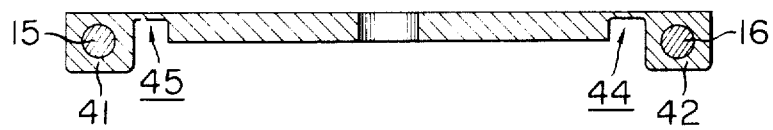
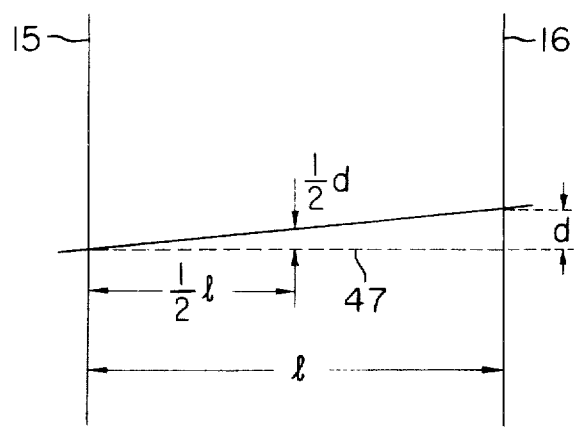

OPTICAL HEAD MOVING DEVICE

BACKGROUND OF THE INVENTION

1. Field of the Invention

This invention relates to a device for moving an optical head including lenses and so on, and, more particularly, to such a device wherein a light irradiating position at which a light beam is focused by an optical head may not be readily affected by error in movement of the optical head.

2. Description of the Prior Art

As a typical method of recording a continuous signal on a recording medium over a long period of time, there has been adopted such, method that tracks in a spiral form are incised on a disk-shaped recording medium, and a "record" which is a disk-shaped recording medium with sound signals recorded thereon has such signal tracks as described above.

In the recording method referred to above, the radial pitch of the signal tracks on the disk-shaped recording medium is determined by the amount of feed of the record head per revolution of a turn table in a record prototype forming apparatus on which the recording medium is placed.

In the production of the prototype of a record, the pitch of the tracks may be considerably great because the recorded signals are not of so high frequency, and therefore the use of the conventional feed screws and the rotating mechanism therefor has resulted in no objectionable pitch irregularity. However, in the "video disk" which has progressively been developed in these years, it is desired that television signals containing over one hundred times as those as many informations contained in the sound record be recorded on a recording medium of a size similar to that of the conventional record, so that, during the production of a video disk prototype, it is necessary to optically record the signals to thereby provide finer signal tracks. It is also imperative to greatly limit the radial pitch of the spirally recorded signal tracks in order to record as many informations as possible. For example, when TV signals of a length of 30 minutes or so are to be recorded on a disk of a size corresponding to that of a 30 cm LP record, the radial pitch of the signal tracks formed in spiral must be selected to a value of several microns.

Thus, in the production of a video disk prototype, the feed of signal light onto the record prototype must be effected with high accuracy.

SUMMARY OF THE INVENTION

It is an object of the present invention to provide an optical head moving device capable of irradiating signal light upon a disk with high accuracy, thereby satisfying the above-noted requirements.

It is another object of the present invention to provide an optical head moving device which, when the optical head for irradiating the signal light upon the disk is moved, reduces occurrence of error in the movement so that such error may not directly lead to an error of the position at which the light beam is focused by the optical head.

It is still another object of the present invention to provide an optical head moving device of a very simple construction which reduces errors during movement of the optical head.

It is yet another object of the present invention to provide an optical head moving device which reduces occurrence of errors in movement of the optical head resulting from the feed screws for moving the optical head.

Other object and effects of the present invention will become fully apparent from the following detailed description taken in conjunction with the accompanying drawings.

BRIEF DESCRIPTION OF THE DRAWINGS

FIG. 2A is a top plan view of a component of the device according to another embodiment of the present invention;

FIG. 2B is a cross-sectional view taken along line B-B' in FIG. 2A;

FIG. 3 is for illustrating the operation of the optical head moving device according to the present invention;

DESCRIPTION OF THE PREFERRED EMBODIMENTS

Figure 1A:
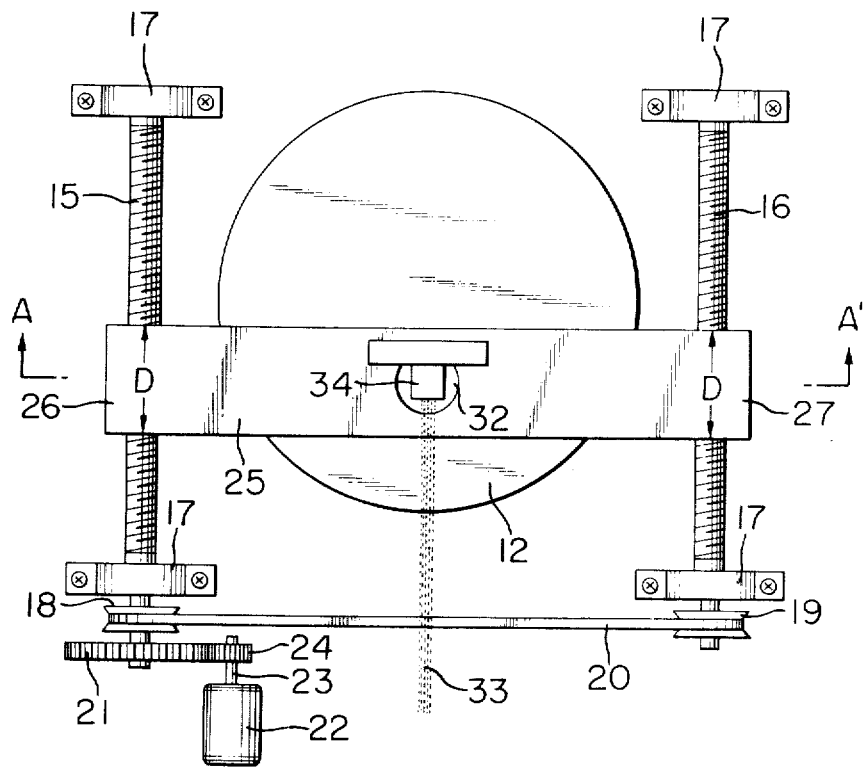
FIG. 1A is a top plan view of the optical head moving device according to an embodiment of the present invention.

The invention will hereinafter be described with respect to an embodiment thereof by reference to the drawings. In FIG. 1, reference numeral 11 designates a turn table, on top of which a disk-shaped recording medium 12 having a photosensitive member is placed. The turn table 11 has its center secured to the rotary shaft 14 of a motor 13 which in turn is secured to a base (not shown).

Designated by 15 and 16 are parallel feed screws (guide members) of the same pitch which are rotatably supported to the base (not shown) by means of bearings 17, and disposed equidistantly from the rotary shaft 14. Pulleys 18 and 19 equal in diameter are secured to the respective feed screws 15 and 16, and a blet 20 extends between, and is wrapped around, the pulleys 18 and 19.

A gear 21 is securely mounted on the feed screw 15 at one end thereof and meshes with a gear 24 securely mounted on the rotary shaft 23 of a motor 22 secured to the base (not shown).

Thus, the motor 22 when energized will rotationally drive the feed screws 15 and 16 at the same speed.

Designated by 25 is a support member for supporting a holding member to be described hereinafter. Restraining portions 26 and 27 are integrally formed with the support member 25 at the opposite ends thereof. In other words, this support member 25 connects the restraining portions 26 and 27 each other to provide a connecting portion.

More particularly, the restraining portions 26 and 27 include cylindrical nuts 28 and 29 threadably engaged with the feed screws 15 and 16 (the length of the nuts being equal to the widthwise dimension D of the restraining portions 26 and 27) and hard rubber members 30 and 31 which are cylindrical resilient members securely fitted over the nuts 28 and 29 (the length of the rubber members being equal to the widthwise dimension D of the restraining portions 26 and 27), the hard rubber members 30 and 31 being received in and secured to mutually parallel bores formed through the restraining portions 26 and 27.

Thus, with the feed screws 15 and 16 threadably engaged by the nuts 28 and 29 (the restraining portions), the support member 25 may be moved by driving the feed screws.

The restraining portions, as already described, are shown to comprise the nuts secured thereto with the resilient members such as hard rubber members 30 and 31 intervening therebetween. It should be understood that the resilient members are not limited to the hard rubber only as shown by way of example, but may be formed of any material which will be deformable over several microns, will resist against deformation in the axial direction of the feed screws or against any twist, and will relatively readily be deformable in a direction perpendicular to the axes of the feed screws. For example, each of the resilient members may also be formed of a suitably bored metal body or a plurality of members combined together to provide the above-described properties. As a further alternative, resilient portions may be formed between the restraining portions and the support member, in the manner as shown in FIG. 2.

Referring to FIG. 2, the restraining portions 41 and 42 are provided at the opposite ends of a support member 40 and threadably engaged directly with the feed screws 15 and 16. Areas of reduced thickness are formed between the support member and the restraining portions and provided with notches 43 and 44' to thereby provide the resilient portions 44 and 45. The support member and the restraining portions are movable together, thereby forming a movable member.

Figure 1B:
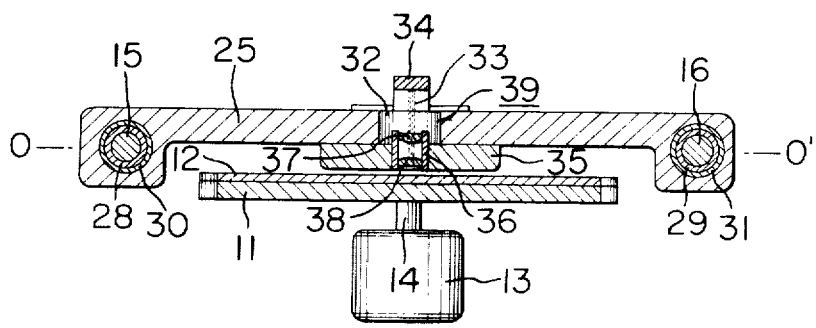
FIG. 1B is a cross-sectional view taken along line A-A' in FIG. 1A.

In FIG. 1, the support member 25 is provided with a through-hole 32 which is centered on a point equidistant from the feed screws 15 and 16, and located on a line passing through the mid-points in the width D of the restraining portions 26 and 27 (hereinafter referred to as the "center point"). Above and over this through-hole 32, a mirror 34 is securely disposed to cause a beam 33 from a laser beam source (not shown) parallel to the feed screws 15 and 16, and passing through the rotational center axis of the recording medium to change its path of travel to a direction downwardly perpendicular to the plane of the drawing sheet of FIG. 1A so as to pass through the aforementioned center point.

Designated by 35 is a holding member comprising a cylindrical casing 36, in which an optical record head 39 accommodating therein lenses 37 and 38 is disposed. The holding member 35 is fixed to the support member 25. The holding member 35 may be provided with a float to maintain the distance between the recording medium 12 rotating of high speed and the optical record head 39 to a predetermined minute value substantially equal to the focal length of the optical record head 39, in which case the holding member 35 and the support member 25 may be resiliently coupled together.

The optical record head 39 is arranged so that, during recording onto the recording medium, the beam 33 reflected by the mirror 34 passes through the centers of the lenses 37 and 38, and that the main point H' (to be described hereinafter) at the side of the beam projection in the optical record head 39 lies on or near the plane O–O' passing through the center axes of the feed screws 15 and 16.

With the above-described arrangement, spiral signal tracks may be formed on the recording medium 12 by rotationally driving the motors 13 and 22 in a correlated manner, and by modulating the beam 33 with the aid of television signals. According to the present invention, such signal tracks may be formed with a further accurate pitch, because the optical record head 12 positioned with the main point H' at the side of the beam projection in the record head lying on or near the plane containing the center axes of two feed screws 15 and 16, and the optical record head is further positioned at the central position between the two feed screws 15 and 16.

Since the two feed screws 15 and 16 are rotationally driven at the same speed, the restraining portions 26 and 27 should theoretically be fed in an entirely equal amount. In reality, however, a difference will occur between the amounts of feed of these restraining portion due to such factors as the friction and play between these parts. Accordingly, at a certain time, the resilient members securing the nuts to the restraining portions would be resiliently deformed with the result that one of the restraining portions 26 and 27 would be advanced or delayed with respect to the other. According to the present invention, however, as seen in FIG. 3, the amount of displacement of the center point will be $\frac{1}{2}d$ even if the straight line 47 passing through the points at $D/2$ on the restraining portions 26 and 27 is advanced by $d$ at the feed screw 16 side, as indicated by solid line, with respect to the dot-line position, at which the line 47 should originally lie between the two feed screws. This equally holds true with a reverse case where the advance $d$ occurs at the side of the feed screw 15, that is, in this case again, the amount of advance is reduced to a half at the center point.

In the foregoing, description has been made of the system whereby the irregularities of feeding are alleviated when the center axes of the nuts movable in meshing engagement with the feed screws are moving in parallel with the axes of the feed screws, but usually the movement of the nuts occurs not with the axes of the nuts being parallel with the axes of the feed screws but with the angle therebetween being varied.

Any variation in such angle would cause inclination of the optical axis of the optical record head which must maintain its perpendicularity to the plane of the FIG. 1A sheet, as well as deviation of the optical record head from its predetermined position in the radial direction of the recording medium.

Figure 4A:
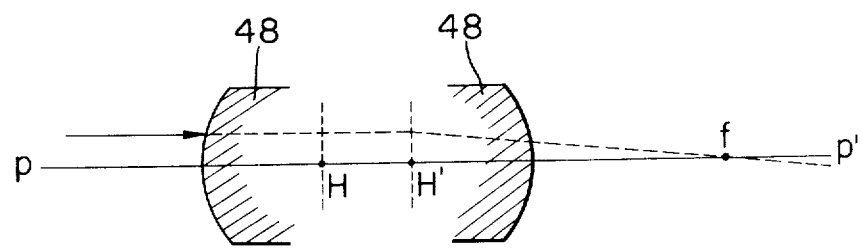
FIGS. 4A and 4B illustrate inclination of the lens.
Figure 4B:
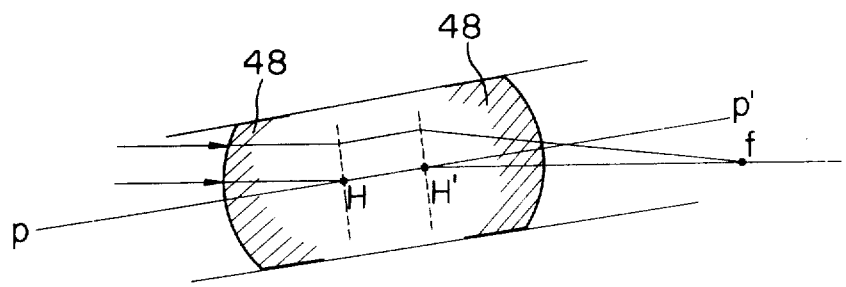

In FIG. 4, a lens 48 (which may be either a composite lens comprising a plurality of lenses combined together, or a single-piece lens) is shown which has two principal points on the optical axis P–P' thereof, namely, the principal point H at the incidence-side and the principal point H' at the projection-side. It is known that, even if the lens 48, of which the optical axis P–P' should be parallel to the incident light, happens to be inclined as shown in FIG. 4B, the position $f$, at which the incident light beam is focused by the lens 48 is invariable as long as the inclination of the lens is centered on the principal point H' at the projection-side.

Figure 5:
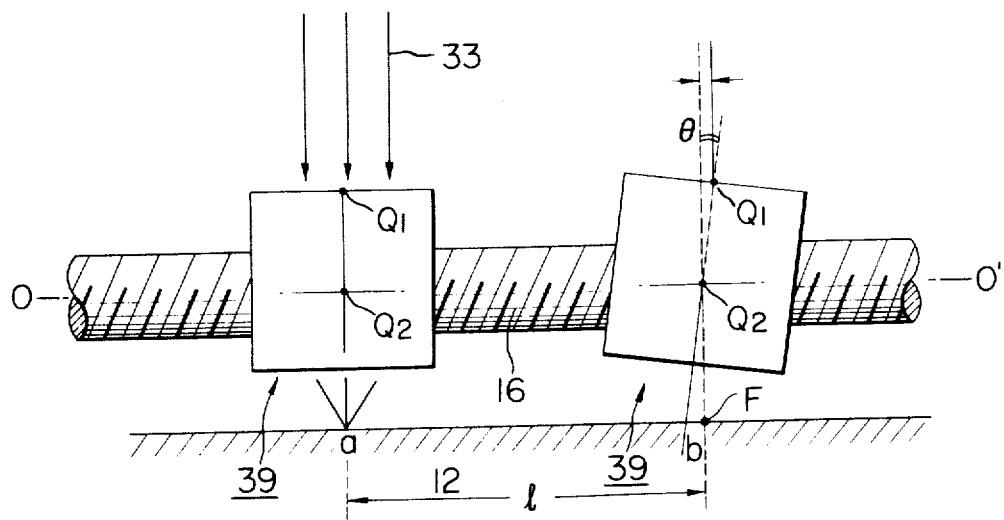
FIG. 5 is a view for illustrating the operation of the optical head moving device according to the present invention and for illustrating the relationship between the feed screw and the record head as seen from a plane parallel to the plane of FIG. 1A sheet.

In the present invention, as shown in FIG. 5, the principal point Q2 at the projection-side in the optical record head 39 lies substantially on the plane O–O', whereby the focusing position of the beam 33 on the recording medium 12 may experience reduced variation, even if the angle between the axes of the feed screws and the nuts is varied to incline the optical record head.

More specifically, as seen in FIG. 5, if the nut is inclined by $\theta$ when it has advanced on the feed screw 16 by a distance $l$ from a point $a$ to a point $b$, then the optical record head will also be inclined by $\theta$ as shown in FIG. 5, However, if the inclination of the optical record head occurs about the point Q2, and as long as the point Q2 lies on the plane O–O' and constitutes the principal point at the projection-side of the optical record head 39, the focusing position F of the beam 32 will lie at $b$, whereby the inclination of the optical record head will affect in no way.

According to the present invention, as has hitherto been described, any error of nut movement in the optical record head movable by movement of nuts threadably engaged with two feed screws may be compensated for to a maximum extent to enable informations to be written on the recording medium with an accurate pitch.

We claim:

1. An optical head moving device comprising:
   a pair of parallel, spaced apart guide members having the axes thereof lying on a common plane;
   a movable member having engaging portions engaged with said pair of guide members and a connecting portion connecting together said engaging portions;
   an optical head for focusing an introduced light beam securely mounted on said movable member in such a manner that a principal point at the projection-side of said optical head lies on the plane containing the axes of said pair of guide members;
   means for introducing a light beam into said optical head; and
   means for moving said optical head by moving said movable member in a state of said engaging portions being in engagement with said guide members.

2. An optical head moving device according to claim 1, further comprising resilient fixing means for resiliently fixing said engaging portions to said connecting portion.

3. An optical head moving device according to claim 1, wherein said guide members are formed of guide rods provided with external feed threads, and said engaging portions are formed of nuts threadably engaged with said feed threads.

4. An optical head moving device according to claim 3, further comprising resilient fixing means for resiliently fixing said nuts to said connecting portion.

5. An optical head moving device comprising:
   a pair of guide members provided by a pair of parallel, spaced apart guide rods formed with external feed threads and having the axes thereof lying on a common plane;
   a movable member provided with nuts threadably engaged with said feed threads and having a connecting portion for connecting together said nuts engaged with said feed threads with resilient members being interposed between said connecting portion and said nuts;
   a through-hole formed in one part of said movable member;
   light-path changing means to cause a beam irradiated in parallel with said guide rods to change the light path thereof to a direction perpendicular to the plane containing the axes of said two guide rods, said light-path changing means being provided in said connecting portion adjacent said through-hole so that the beam after having changed the path thereof passes through said through-aperture;
   an optical head securely mounted on said movable member for focusing said beam after having changed the light path thereof, said optical head having the principal point at the projection-side thereof disposed on the plane containing the axes of said guide rods; and
   means for rotationally driving said pair of guide rods at the same time to move said nuts on said guide rods at equal speeds, thereby moving said optical head.

6. An optical head moving device comprising:
   a pair of parallel, spaced apart guide members having the axes thereof lying on a common plane;
   a movable member having a pair of engaging portions respectively engaged with said pair of guide members, and a connecting portion connecting together said engaging portions;
   an optical head for focusing an introduced light beam securely mounted on said movable members in such a manner that the principal point at the projection-side of said optical head lies on the plane containing the axes of said pair of guide members, and that said optical head is equidistant from said pair of guide members;
   means for introducing a light beam into said optical head; and
   means for moving said optical head by moving said movable members in a state of said engaging portions being in engagement with said guide members.

7. An optical head moving device according to claim 6, wherein said optical head is located on a line passing through the centers of said engaging portions with respect to the directions in which said guide members extend.

8. An optical head moving device according to claim 6, further comprising resilient fixing means for resiliently fixing said engaging portions to said connecting portion.

9. An optical head moving device according to claim 6, wherein said guide members are formed of guide rods provided with external feed threads, and said engaging portions are formed of nuts threadably engaged with said feed threads.

10. An optical head moving device according to claim 9, further comprising resilient fixing means for resiliently fixing said nuts to said connecting portion.

11. An optical head moving device comprising:
    a pair of guide members provided by a pair of parallel, spaced apart guide rods formed with external feed threads and having the axes thereof lying on a common plane;
    a movable member provided with nuts threadably engaged with said feed threads and having a connecting portion for connecting together said nuts engaged with said feed threads with resilient members being interposed between said connecting portion and said nuts;
    a through-hole formed in said movable member in the middle of said pair of guide members;
    light-path changing means to cause a beam irradiated in parallel with said guide rods to change the light path thereof to a direction perpendicular to the plane containing the axes of said two guide rods, said light-path changing means being provided in said connecting portion adjacent said through-hole so that the beam after having changed the path thereof passes through said through-aperture;

an optical head securely mounted on said movable member in such a manner as to focusing said beam after having changed the light path thereof, positioning the principal point at the projection-side thereof disposed on the plane containing the axes of said guide rods, and further positioning the point equidistantly from said pair of guide members, and;

means for rotationally driving said pair of guide rods at the same time to move said nuts on said guide rods at equal speeds, thereby moving said optical head.

* * * * *